United States Patent
Kurzer et al.

[11] Patent Number: 6,059,270
[45] Date of Patent: May 9, 2000

[54] LIQUID ENRICHED WITH A GAS, A METHOD OF ENRICHING A LIQUID WITH A GAS, AND AN APPARATUS FOR ENRICHING A LIQUID WITH A GAS

[75] Inventors: Fritz Kurzer; Frank Kurzer, both of Osterholz-Shambeck, Germany

[73] Assignee: KKB 02 Fluid Production GmbH, Germany

[21] Appl. No.: 09/057,553

[22] Filed: Apr. 9, 1998

[51] Int. Cl.[7] ................................................ B01F 3/04
[52] U.S. Cl. .................... 261/29; 261/79.2; 261/84; 95/172; 426/474
[58] Field of Search ........................ 261/29, 36.1, 79.2, 261/84, 91, 92, 119.1, DIG. 7; 95/151, 172, 185, 261, 266; 96/196, 214, 215; 426/474, 477

[56] References Cited

U.S. PATENT DOCUMENTS

| | | | |
|---|---|---|---|
| 1,808,956 | 6/1931 | Ketterer | 261/36.1 |
| 1,917,577 | 7/1933 | Doble, Jr. | 261/29 |
| 2,057,100 | 10/1936 | Jespersen | 261/29 |
| 2,560,526 | 7/1951 | Thompson | 261/DIG. 7 |
| 3,478,929 | 11/1969 | Cornelius | 426/477 |
| 3,877,358 | 4/1975 | Karr | 261/DIG. 7 |
| 3,944,466 | 3/1976 | Marchese | 95/266 |
| 4,235,719 | 11/1980 | Pearson . | |
| 4,956,080 | 9/1990 | Josefik | 261/29 |
| 5,006,352 | 4/1991 | Zoltai et al. | 426/477 |
| 5,747,079 | 5/1998 | Hoffman | 426/477 |

FOREIGN PATENT DOCUMENTS

| | | | |
|---|---|---|---|
| 864680 | 1/1953 | Germany | 261/29 |
| 2059415 | 6/1971 | Germany | 261/36.1 |
| 52-46375 | 4/1977 | Japan | 261/29 |

Primary Examiner—C. Scott Bushey
Attorney, Agent, or Firm—Christopher W. Lynt

[57] ABSTRACT

A liquid enriched with a free gas, in particular, water enriched with free oxygen, is produced by mixing the gas and liquid in an overpressurized system to form a mixture and then abruptly reducing the pressure of the mixture.

6 Claims, 1 Drawing Sheet

LIQUID ENRICHED WITH A GAS, A METHOD OF ENRICHING A LIQUID WITH A GAS, AND AN APPARATUS FOR ENRICHING A LIQUID WITH A GAS

CROSS-REFERENCE TO RELATED APPLICATIONS

The present application is related to German application number 197 49 020.4, filed Nov. 6, 1997, the subject matter of which is hereby incorporated by reference in its entirety.

BACKGROUND OF THE INVENTION

1. Field of the Invention

The invention relates to a liquid enriched with a gas, and in particular, to water enriched with oxygen. The invention further relates to a method of enriching a liquid with a gas, and in particular, enriching water with oxygen. The invention further relates to an apparatus for enriching a liquid with a gas, and in particular, for enriching water with oxygen.

2. Background Information

It is known that all of the vital functions contributing to the human metabolism require oxygen, and that it is necessary for the human organism to obtain sufficient oxygen through breathing. However, methods have been developed for purposefully supplying the human organism with oxygen in addition to that obtained through breathing. Such additional oxygen can be supplied for generally improving normal function and well-being, on the one hand, but can also be used particularly as a treatment, or as a supplement to a treatment, for sick individuals, for example. To accomplish this, it is known to use enriched water, that is, water enriched with free oxygen.

In one known method of enriching water with oxygen, oxygen is supplied to water via a perlite disposed on the bottom of an open container that is filled with water. Perlite is a volcanic mineral which is rather porous. The oxygen is forced through the perlite at low pressure, bubbles through the water in the container, and subsequently escapes into the environment, i.e., the atmosphere, through the surface of the water. As the oxygen passes through the water, the water is enriched with oxygen, thus establishing a concentration value of "free" oxygen (only physically-bonded oxygen) in the water of about 35 mg/l.

This known method has some drawbacks, however. For example, the concentration of free oxygen in the water that is obtained with this known method, about 35 mg/l, is relatively low. Furthermore, after bubbling through the liquid, a portion of the supplied oxygen escapes into the environment (atmosphere) and cannot be reused, thereby resulting in a high gas consumption for the amount of enriched water obtained.

While there may be beneficial effects to a human organism of water enriched at the known relatively low concentrations, better results could be obtained if higher levels of enrichment could be achieved. Further, if less oxygen were lost to the atmosphere, the costs of producing oxygen enriched water could be reduced.

Besides use for human consumption for general well being and in therapeutic methods as referred to above, oxygen enriched water has other known uses, such as in water purification processes, cleaning processes, and the like. Further, it may be desirable to enrich other liquids with other gases for other uses, at higher concentrations than currently achievable, and with less wasted gas.

Therefore, a need existed for water more highly enriched with oxygen, a method of achieving the higher enrichment, and an apparatus for achieving the higher enrichment. A need has further existed for other liquid/gas-enriched products, as well as a method and apparatus for producing them.

SUMMARY OF THE INVENTION

It is a principle object of the present invention to meet the above-described needs and overcome the above-described drawbacks of the prior products, methods, and apparatus.

It is an object of the invention to provide a method for enriching a liquid with gas such that the liquid has a high concentration of free gas, while simultaneously reducing the gas consumption in the process.

It is a further object of the invention to provide an apparatus for enriching a liquid with a gas such that the liquid has a high concentration of free gas, and gas consumption is reduced.

It is a further object of the invention to provide a method and an apparatus, for producing water enriched with oxygen to a relatively higher concentration than previously achieved, while simultaneously reducing the amount of oxygen consumed.

These objects are accomplished in accordance with the invention by first enriching the liquid with the gas in a closed overpressure system, and following the enriching of the liquid, abruptly expanding the gas-enriched liquid through subjecting it to an abrupt pressure drop.

In the invention, because the gas is supplied to the liquid in a closed overpressure system, any excess gas is prevented from escaping into the environment (atmosphere) from the liquid and can be recapture for use in further enrichment of the liquid. According to an aspect of the invention, any excess gas that does not enrich the liquid during a first enriching process, remains inside the overpressure system, and can advantageously be used for at least one further enriching process.

While supplying the gas to the liquid under pressure effects an enrichment of gas in the liquid, this enrichment occurs under high pressure, and a close connection or "bond" forms between the gas and the liquid, for example oxygen and water. That is, no high concentration of "free" gas in the liquid is obtained solely through the supplying of gas to the liquid under high pressure. The high concentration of "free" gas in the gas-enriched liquid is achieved through the pressure drop, for example, by conducting the gas-enriched liquid out of the overpressure system into a lower pressure area where abrupt expansion occurs. The gas-enriched liquid can expand because of the lower pressure. As the gas-enriched liquid expands, the gas that was bonded to the liquid in the overpressure system is freed. This significantly increases the concentration of free gas in the liquid, e.g., free oxygen in water.

According to an aspect of the invention, the speed at which the gas-enriched liquid is conducted out of the closed overpressure system can be selectively set to effect an abrupt expansion. An abrupt expansion, that is, an accelerated, practically immediate expansion, effects an especially high concentration of "free" gas in the liquid. It has been determined that the rapidity of expansion and the attainable concentration of free gas are directly proportional, so that the faster the expansion, the higher the concentration of free gas in the enriched liquid is obtained. A rapid expansion of the liquid is attained, for example, through an accelerated conduction of the gas-enriched liquid out of the closed overpressure system. By setting this conduction speed of the gas-enriched liquid, the desired concentration of free gas in the liquid is advantageously selectable.

According to an aspect of the invention, the gas-enriched liquid that is conducted away from the closed overpressure system is expanded in a lower pressure system provided with an outlet, with a pressure drop occurring along the path of this transfer due to the different pressures dominating in the systems. As the gas-enriched liquid is conducted through this pressure drop, it expands, causing the gas in the liquid to be freed. The pressure ratios in the closed system and the pressure system having the outlet can be set, preferably dependently on one another. For example, the pressure in the closed overpressure system can be set in the range of about 1.5 to 6 bar, while the pressure in the lower pressure system having the outlet can be set in the range of about 0.2 to 2.5 bar. The pressures are set so that a distinct pressure drop occurs between the two systems, leading to an expansion of the gas-enriched liquid, during which the gas in the liquid is freed.

According to another aspect of the invention, an apparatus is provided which has a reservoir container for holding a liquid, which is connected to a high-pressure gas supply line to form a closed overpressure system. The reservoir container is further connected to conduct gas-enriched liquid to a chamber having a pressure that is lower in comparison to the reservoir container, which connection can be opened and closed selectively. A pressure regulator at the high-pressure gas supply can be used to adjust the pressure in the closed overpressure system.

According to another aspect of the invention, a lower portion of the container holds the liquid and the gas is supplied to an upper portion of the container. An external enrichment arrangement in the form of a closed loop is provided having a first line connected to the container for drawing gas from the upper portion, a second line connected to the container for drawing liquid from the lower portion, a junction for combining the first and second lines into a common line carrying both liquid and gas, a supply device for receiving the liquid and gas from the common line and performing a first mixing, and a swirling device connected to an output of the supply device for performing a second mixing and providing gas-enriched liquid back to the container at an upper portion thereof.

Instead of the external enrichment arrangement closed loop, an internal enrichment device, i.e., internal to the container, may be provided, according to an alternate embodiment. Likewise, there could be separate containers for unenriched liquid and the gas-enriched liquid instead of the one container, according to an alternative embodiment.

According to further aspects of the invention, the supply device is a centrifugal pump, the swirling device is a cyclone swirling chamber in which a net, screen or the like can be additionally installed, and the container has an overpressure release valve at a top thereof. The centrifugal pump may include a high-pressure injector.

According to another aspect of the invention, adjustable valves, e.g., sliding valves, are provided on the first line, the second line and between the swirling device and the container, to control the flow of gas, liquid and gas-enriched liquid through the enrichment arrangement closed loop. Pressure sensing devices, pressure sensors, are also provided in the common line and at the output of the supply device, for example, as well as at the container, for sensing the respective pressures. Adjustment of the valves may also be used to obtain the desired pressures as measured by the pressure sensors.

According to a further aspect of the invention, the chamber having a pressure that is lower in comparison to the reservoir container is a hollow ball valve, having openable and closeable slot-shaped openings on a line leading from the container to the chamber. A pressure sensor measures the pressure inside the hollow ball valve. Pressure and flow speed sensors are provided at an outlet from the hollow ball valve, along with a gas measurement sensor for detecting the amount of free gas in liquid thereat.

The sensors and valves may form part of an automatic control system operated by a digital computer, for example, whereby desired levels of gas-enrichment may be set and conveniently monitored, based on pressures and flows in the apparatus. Alternatively, the system may be manually adjusted by manual actuation of the valves based on manual reading of the sensors' indications.

According to an aspect of the invention, the gas and the liquid are mixed in the supply device, and in the process, the liquid is enriched with the gas in the above-described manner, such that the gas is bonded to the liquid. That is, a measurably high concentration of "free" gas in the liquid has not yet been attained. The gas-enriched liquid is returned to the reservoir container following the mixing process. The chamber in which the dominating pressure is lower in comparison to the reservoir container is connected to the reservoir container to receive liquid therefrom. The connection is embodied such that it can be opened and closed. When opened, gas-enriched liquid exits the reservoir container and enters the chamber due to the different pressure ratios. The gas-enriched liquid is expanded according to the invention, and the gas that was previously bonded in the liquid is freed.

According to an aspect of the invention, the reservoir container is embodied as a tank, for example, that is initially filled, in the absence of pressure, to about ⅔ capacity with the liquid. The gas intended to enrich the liquid is introduced into the upper third of the tank. The gas is introduced under high pressure, and the tank, along with adjacent enrichment components, form a closed overpressure system. Water, for example, is used as the liquid, and oxygen supplied from a commercially-available, high-pressure oxygen source is supplied as the gas. The pressure in the closed overpressure system can be adjusted with a pressure regulator provided at the oxygen source, as well as with a pressure relief valve provided on the reservoir container tank.

As mentioned above, the liquid and the gas can be mixed by, for example, a supply device disposed in the container. However, in the preferred embodiment, the reservoir container is connected via a closed loop system to conduct liquid and gas to an external supply device, in which they are mixed together, resulting in the bonded enrichment of the liquid with the gas. As already mentioned, in an embodiment, the supply device is a centrifugal pump having a high-pressure injector, which is connected via a closed loop system to the reservoir container. A centrifugal pump having a high-pressure injector is capable of suctioning and further conducting a gas in addition to a liquid, or a liquid/gas mixture. The centrifugal pump suctions liquid and gas, and swirls them together as they pass quickly through the pump. Thus, the liquid is enriched with the gas, but this is a bonded enrichment; in other words, a close (strong) bonding of the gas to the liquid is achieved.

According to an aspect of the invention, on the suction side of the centrifugal pump, the loop system includes a gas line that exits the upper region of the reservoir container, and a liquid line that exits the lower region of the reservoir container, the lines being guided to a common line directly in front of the centrifugal pump. The gas line and the liquid line are connected to the reservoir container such that they can remove gas and liquid, respectively, from the different regions of the reservoir container. Because these lines are guided together to a common line, a liquid/gas mixture is supplied to the centrifugal pump. A vacuum is simultaneously formed in the gas line, for example, due to the suction of the liquid through the centrifugal pump. A suction of the gas through the centrifugal pump is therefore simultaneously achieved. On the discharge side of the centrifugal pump, a swirling device may be disposed in a line between the centrifugal pump and the reservoir container. A further mixing of liquid and gas can advantageously be achieved with the swirling device. A cyclone swirling chamber, for example, in which a net, a screen or the like can additionally be installed, can be used as a swirling device. As the gas-enriched liquid passes through the device, it is swirled, effecting further mixing of the liquid and the gas. An advantage of this embodiment is that the degree of enrichment of the gas in the liquid is increased. The provided swirling device simultaneously represents a pressure-reducing device. While a vacuum exists on the suction side of the supply device, causing the media of gas and liquid to be suctioned into the supply device, an overpressure exists on the other side of the supply device. This overpressure can be reduced in the swirling device. This is achieved, for example, by an effective widening of the cross section of the line between the supply device and the container in the swirling device.

According to an exemplary embodiment of the invention, the chamber having a lower pressure than the reservoir container comprises a hollow ball valve that is disposed in a line for gas-enriched liquid leading out of the reservoir container. Inside its hollow ball, the hollow ball valve has a space in which a specific pressure can be realized. The interior of the hollow ball valve forms a pressure system having an outlet. The pressure dominating here is significantly less than the pressure in the overpressure system of the reservoir container. The pressure drop is achieved in that, in the closed position, the interior of the hollow ball valve is not a component of the overpressure system. For conducting away the gas-enriched liquid, the hollow ball valve is only opened slightly, forming a very narrow, nozzle-shaped opening. The openings for the passage of the liquid, which are formed between the interior of the hollow ball valve and the lines that lead away when the valve opens, are preferably slot-shaped. Because of this slot-shaped feature, the liquid is forced rapidly into the interior of the hollow ball valve under high pressure. The gas-enriched liquid enters the interior of which is under a substantially lower pressure, and can expand abruptly. According to the invention, during this expansion, the gas that was previously bonded to the liquid is converted into "free" gas in the liquid. This free gas in the liquid is a physically bonded gas that nevertheless forms no chemical compound with the molecules of the liquid, and is therefore "free." The hollow ball valve can be opened to a greater or lesser extent, which widens the slot-like opening between the interior of hollow ball valve and the lines leading away, so the pressure inside the hollow ball valve can be thereby set directly. To monitor the pressure, a pressure sensor (manometer) is also preferably disposed inside the hollow ball valve. A pressure sensor that measures and indicates the pressure dominating in the reservoir container is preferably associated with the reservoir container, as well.

In a preferred embodiment, a flow-speed measurement device is disposed in a line that carries away gas-enriched liquid, downstream of the hollow ball valve in the flow direction of the liquid. In addition to the different pressures in the reservoir container and the inside of the hollow ball valve, the flow speed of the liquid through the hollow ball valve is a variable on which the concentration of the free gas in the liquid is dependent. This flow speed is monitored with the flow-speed measuring device. The value of the flow speed is a function of the set pressures and the size of the openings. Moreover, a gas measurement device, with which the concentration of free gas in the gas-enriched liquid can be measured and monitored, is disposed in the line that carries away the gas-enriched liquid, downstream of the hollow ball valve in the flow direction of the liquid. For optimum measurement by this gas measurement device, a specific liquid flow speed is set, which is monitored with the flow-speed measurement device.

A line leading out of the hollow ball valve terminates in an outlet that can be opened and closed, and out of which liquid enriched with free gas can be removed. The liquid is drawn off, for example, into diffusion-tight containers.

A gas-enriched liquid, in particular, water enriched with oxygen, which can be produced by the exemplary method and apparatus according to the invention, is advantageously characterized by a concentration of free gas of over 60 mg/l. In particular, water enriched in accordance with the invention may have a concentration of free oxygen of over 200 mg/l.

DETAILED DESCRIPTION OF THE PREFERRED EMBODIMENT

Figure 1:
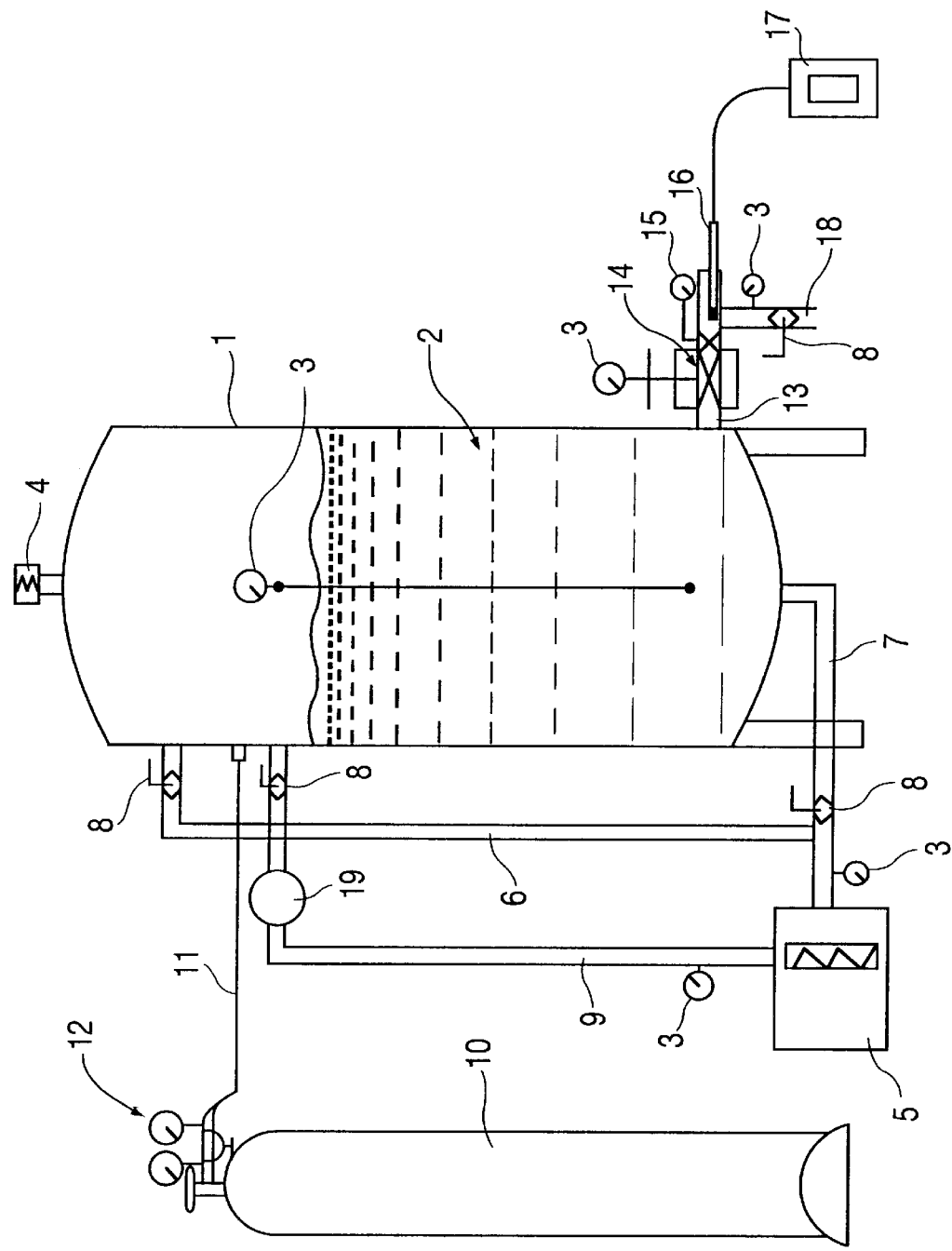
FIG. 1 illustrates an exemplary embodiment of an apparatus according to the invention for enriching a liquid with a gas.

The invention will now be described in more detail by way of example with reference to the embodiment shown in the accompanying figure. It should be kept in mind that the following described embodiment is only presented by way of example and should not be construed as limiting the inventive concept to any particular physical configuration.

The apparatus illustrated in FIG. 1 comprises a reservoir container 1 for holding a gas-enriched liquid 2. Reservoir container 1 is provided with a pressure sensing and indicating device (manometer) 3 for displaying the pressure in reservoir container 1, and with an overpressure valve 4. Reservoir container 1 is connected to an enrichment arrangement, a closed loop system, for enriching a liquid with a gas.

The enrichment loop includes a supply device 5 for mixing a gas with a liquid. Supply device 5 comprises, for example, a centrifugal pump. On the intake side of the centrifugal pump supply device 5, a common line having a manometer 3 is provided for feeding a liquid and a gas to the pump 5 from the reservoir container 1. Gas line 6 leads away from the upper region of reservoir container 1, and liquid line 7 leads away from the lower region of reservoir container 1, these lines joining at the common line feeding the supply device 5 immediately upstream of supply device 5 in the flow direction. An adjustable slide valve 8 is disposed in liquid line 7, upstream of the joining point with gas line 6, and an adjustable slide valve 8 is provided in gas line 6, upstream of the joining point with liquid line 7.

A line 9 for a gas/liquid mixture leads back to reservoir container 1 from supply device 5, so that the supply device 5 is disposed in a closed loop. A swirling device 19 is disposed in line 9 between the supply device 5 and the reservoir container 1. This swirling device 19 can be, for example, a cyclone swirling chamber. A slide valve 8 is likewise disposed in line 9 downstream of the swirling device 19.

The gas that is used to enrich the liquid is stored in the upper region of reservoir container 1. The gas can be introduced into reservoir container 1 via a line 11 from an external gas tank 10, for example. Gas tank 10 is a high-pressure gas tank having a pressure regulator 12 in line 11 at the outlet of the tank 10. The pressure of the gas in reservoir container 1, and therefore the closed system formed by reservoir system 1, supply device 5 and lines 6, 7 and 9, can be set to a desired overpressure value (e.g., a pressure greater than atmospheric pressure) with pressure regulator 12. For example, a pressure of 1.5 to 6.0 bars may be set. Overpressure relief valve 4 on container 1 also serves to control the pressure in the container 1 by preventing the pressure from exceeding a certain set value, for example.

A line 13 for carrying gas-enriched liquid away from the reservoir container 1 is connected to the lower region of reservoir container 1. Line 13 leads to a chamber 14 in which the dominating pressure is lower than the dominating pressure in the reservoir container 1. This chamber is embodied by a schematically-illustrated hollow ball valve 14, for example, which is inserted into line 13. A manometer 3 associated with hollow ball valve 14 measures the pressure inside hollow ball valve 14.

Further components are disposed in line 13, downstream of hollow ball valve 14 in the flow direction. In particular, a flow-speed measurement device 15 and the sensor 16 of a gas-measurement device 17 are disposed in line 13. Line 13 ultimately terminates in an outlet 18, with which a manometer 3 and a slide valve 8 are associated.

The apparatus shown in the drawing is used for enriching a liquid with a gas according to the following method. A quantity of water is supplied to the container 1 absent pressure to a level of, for example, two-thirds full. The gas is then supplied to container 1 to establish an overpressure environment therein to a preselected pressure. The gas and liquid now stored in reservoir container 1 at a selected overpressure are supplied via lines 6 and 7, respectively, to the common line and thereby to supply device 5. The two media, liquid and gas, are mixed in supply device 5. In the process, the liquid is enriched with the gas such that the gas is bonded to the liquid. A concentration of free gas, that is, only physically-bonded gas, in the liquid, however, is still low at this point. The liquid and gas are mixed further in the swirling device 19 disposed in line 9, and the further mixed liquid and gas is supplied back to reservoir container 1. In this way, the liquid and gas are mixed in a closed loop overpressure system comprising the reservoir container 1, the supply device 5, the swirling device 19, and lines 6, 7 and 9. Since the system is closed, any excess gas which does not bond with the liquid will be advantageously contained in container 1 and be usable for further enrichment, according to an object of the invention.

Subsequent to enrichment through the closed loop overpressure system, liquid 2 enriched with bonded gas is provided to the interior of hollow ball valve 14 via line 13. The liquid 2 is forced at high pressure through slot-like, narrow openings between the interior of hollow ball valve 14 and line 13, as a result of the different pressures in reservoir container 1 and hollow ball valve 14. As the gas-enriched (bonded) liquid 2 enters the lower pressure interior of hollow ball valve 14, it expands abruptly, thereby freeing the gas bonded in the liquid 2. Because of the abrupt expansion, concentrations of free gas in liquid 2 of over 60 mg/l can be attained.

For example, if water is enriched with oxygen, a concentration over 200 mg/l can be achieved according to the above-described apparatus and method. The expansion in hollow ball valve 14 is monitored by flow-speed measurement device 15 and the gas concentration is monitored by gas-measurement device 17 with sensor 16. The liquid enriched with free gas can be removed from the apparatus at outlet 18, and can be drawn off into transportable containers, for example.

The operation may be performed manually, or under the control of a automatic control system including a digital computer, for example, as would be apparent to one skilled in the art.

It will be apparent to one skilled in the art that the manner of making and using the claimed invention has been adequately disclosed in the above-written description of the preferred embodiment taken together with the drawing.

It will be understood that the above described preferred embodiment of the present invention is susceptible to various modifications, changes, and adaptations, and the same are intended to be comprehended within the meaning and range of equivalents of the appended claims.

For example, instead of the external enrichment arrangement, an internal to the container enrichment arrangement could be used. Further, besides the hollow ball valve, other ways could be used for effecting the abrupt pressure drop, as would be apparent to one skilled in the art.

What is claimed is:

1. A method of making a liquid enriched with a free gas, comprising:

providing a closed con providing a quantity a liquid to a preselected level;

providing a quantity of a pressurized gas to the container establishing a preselected pressure in the container;

enriching the liquid in the container with the gas in the container using a mixing device to form a liquid enriched with a gas bonded to the liquid, wherein the enriching comprises:

drawing off gas from an upper portion of the container;

drawing off liquid from a lower portion of the container;

combining the gas and liquid drawn off, and providing the combined gas and liquid to the mixing device;

mixing the gas and liquid in the mixing device, wherein the mixing comprises first mixing the gas and liquid in a centrifugal pump to produce a gas/liquid mixture and then further mixing the gas/liquid mixture in a cyclone swirling chamber; and outputting from the mixing device to the container, a liquid enriched with a gas bonded to the liquid; and providing an abrupt pressure drop to the liquid enriched with a gas bonded to the liquid, thereby freeing gas bonded in the liquid and forming a liquid enriched with a free gas.

2. The method according to claim 1, wherein the providing a closed container with a quantity of a liquid to a preselected level comprises filling the container to about two-thirds with the liquid.

3. The method according to claim 1, wherein the providing a quantity of a pressurized gas to the container establishing a preselected pressure in the container comprises establishing a pressure in the range of about 1.5 to 6.0 bars.

4. The method according to claim 1, wherein the providing an abrupt pressure drop to the liquid enriched with a gas bonded to the liquid, thereby freeing gas bonded in the liquid and forming a liquid enriched with a free gas, comprises rapidly introducing the liquid enriched with a gas bonded to the liquid into a chamber having a pressure lower than the pressure in the container.

5. The method according to claim 4, wherein the providing a quantity of a pressurized gas to the container establishing a preselected pressure in the container comprises establishing a pressure in the range of about 1.5 to 6.0 bars; and wherein the introducing the liquid enriched with a gas bonded to the liquid into a chamber having a pressure lower than the pressure in the container comprises introducing the liquid enriched with a gas bonded to the liquid into a chamber having a pressure in the range of about 0.2 to 2.5 bars.

6. A method of making a liquid enriched with a free gas, comprising:

providing a closed container with a quantity of a liquid to a preselected level;

providing a quantity of a pressurized gas to the container establishing a preselected pressure in the container;

enriching the liquid in the container with the gas in the container using a mixing device to form a liquid enriched with a gas bonded to the liquid; and providing an abrupt pressure drop to the liquid enriched with a gas bonded to the liquid, thereby freeing gas bonded in the liquid and forming a liquid enriched with a free gas;

wherein:

the providing a closed container with a quantity of a liquid to a preselected level comprises filling the container to two-thirds with the liquid;

the providing a quantity of a pressurized gas to the container establishing a preselected pressure in the container comprises establishing a pressure in the range of about 1.5 to 6.0 bars;

the enriching the liquid in the container with the gas in the container using a mixing device to form a liquid enriched with a gas bonded to the liquid comprises:

drawing off gas from an upper portion of the container;

drawing off liquid from a lower portion of the container;

combining the gas and liquid drawn off, and providing the combined gas and liquid to the mixing device;

mixing the gas and liquid in the mixing device; and outputting from the mixing device to the container, a liquid enriched with a gas bonded to the liquid;

the mixing the gas and liquid in the mixing device comprises first mixing the gas and liquid in a centrifugal pump to produce a gas/liquid mixture and then further mixing the gas/liquid mixture in a cyclone swirling chamber;

the providing an abrupt pressure drop to the liquid enriched with a gas bonded to the liquid, thereby freeing gas bonded in the liquid and forming a liquid enriched with a free gas, comprises rapidly introducing the liquid enriched with a gas bonded to the liquid into a chamber having a pressure lower than the pressure in the container; and the introducing the liquid enriched with a gas bonded to the liquid into a chamber having a pressure lower than the pressure in the container comprises introducing the liquid enriched with a gas bonded to the liquid into a chamber having a pressure in the range of about 0.2 to 2.5 bars.

* * * * *